United States Patent [19]

Fujioka et al.

[11] Patent Number: 4,499,414
[45] Date of Patent: Feb. 12, 1985

[54] AC MOTOR CONTROL METHOD

[75] Inventors: Yoshiki Fujioka, Higashiyamato; Mitsuhiko Hirota, Tokyo, both of Japan

[73] Assignee: Fanuc Ltd, Minamitsuru, Japan

[21] Appl. No.: 438,692

[22] Filed: Nov. 2, 1982

[30] Foreign Application Priority Data

Nov. 4, 1981 [JP] Japan .............................. 56-176748

[51] Int. Cl.³ .............................................. H02P 5/40
[52] U.S. Cl. .................................... 318/803; 318/807
[58] Field of Search .......................... 318/803, 807–811

[56] References Cited

U.S. PATENT DOCUMENTS

| | | | |
|---|---|---|---|
| 3,477,002 | 11/1969 | Campbell . | |
| 3,899,725 | 8/1975 | Plunkett . | |
| 3,983,463 | 9/1976 | Nabae et al. | 318/803 |
| 4,281,276 | 7/1981 | Cutler et al. | 318/810 |
| 4,392,100 | 7/1983 | Stanton et al. | 318/808 |

OTHER PUBLICATIONS

IEEE 1980 IECI Proceedings on Applications of Mini and Microcomputers, Mar. 17th–20th 1980, pp. 45–52, Philadelphia, (U.S.A.): V. V. Athan et al., "Microprocessor Control of a Three Phase Invertor Used in Induction Motor Speed Control System".

*Primary Examiner*—David Smith, Jr.
*Attorney, Agent, or Firm*—Staas & Halsey

[57] ABSTRACT

A method of controlling an AC motor which exhibits a constant torque characteristic at a rotational speed N below a base speed Nb and a constant output characteristic at a rotational speed N above the base speed Nb, comprising the steps of finding a base speed $N_L$ after limiting the output power of the AC motor, $N_L$ being derived from the base speed Nb and the ratio $\eta$ between maximum output power $Pmax_1$ and maximum output power $Pmax_2$ before and after the output power of the AC is limited, respectively, rendering the slip frequency of the AC motor constant until the rotational speed N of the AC motor reaches the base speed $N_L$, varying the slip frequency in inverse proportion to the rotational speed N for N between $N_L$ and Nb ($N_L < N \leq Nb$), and varying the slip frequency in proportion to the rotational speed N for N above Nb (Nb < N), whereby the output power of the AC motor is rendered constant at a rotational speed N above $N_L$.

5 Claims, 7 Drawing Figures

AC MOTOR CONTROL METHOD

BACKGROUND OF THE INVENTION

This invention relates to an AC motor control method and, more particularly, to an AC motor control method in which a region of constant output power can be enlarged in cases where the AC motor output power is limited in magnitude.

Figure 1:
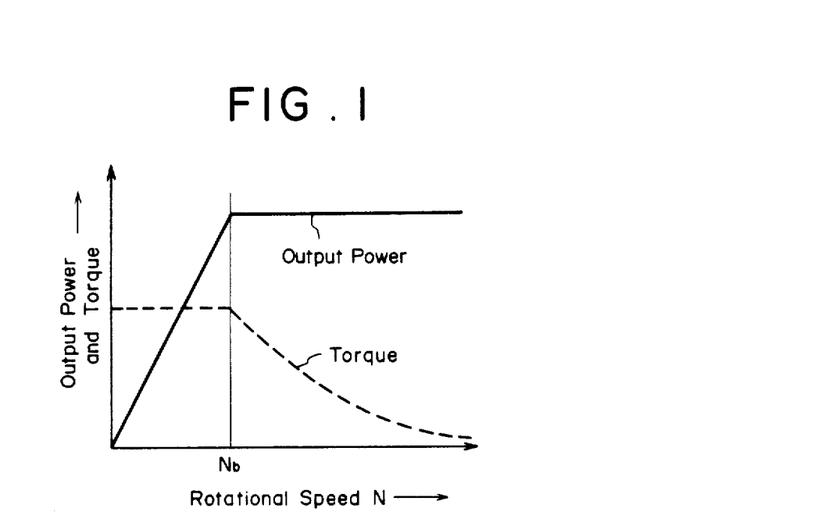
FIG. 1 is a graph of the characteristics of an AC motor.

AC motors (induction motors) develop a constant output (constant output characteristic) at speeds above a certain constant speed (base speed), and develop a constant torque (constant torque characteristic) at speeds below the base speed. This may be understood from FIG. 1, which shows the characteristics of an AC motor. The solid line indicates the output power (KVA)—speed characteristic, and the broken line the torque—speed characteristic. Nb indicates the base speed. In AC motors of this kind, the following three advantages would manifest themselves if it were possible to decrease the AC motor output power with a decrease in load and widen the region of the constant output characteristic:

(1) the power supply output (KVA) can be reduced in proportion to the output power of the AC motor, making it possible to reduce the power supply capacity for small loads even if the capacity of the AC motor is large;

(2) the number of gear stages can be reduced in cases where the AC motor is employed as a spindle motor in a small-size machining center; and (3) in the constant peripheral speed control of a lathe or the like, cutting can be performed while exploiting the output power of the motor to the maximum extent by widening the region of the constant output characteristic.

Hereinafter, control executed for the purpose of reducing AC motor output power in accordance with the size of a load and widening the constant output characteristic region shall be referred to as output limitation control.

Figure 2:
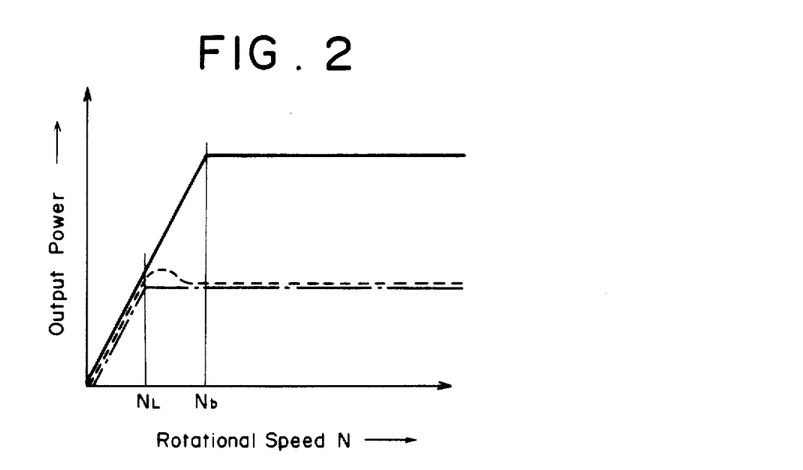
FIG. 2 is a graph of the characteristics of an AC motor in accordance with a conventional control method.

If we assume that a voltage—speed characteristic is as represented by the solid line in FIG. 2 without application of output limitation control, then the desired characteristic would be as shown by the dot-and-dash line if output limitation control were applied. With methods according to the prior art, however, the output—speed characteristic actually obtained is as depicted by the dashed line, even with output limitation control. It will be appreciated that the region of constant output power cannot be widened significantly according to the prior art, making it impossible to realize the three advantages set forth above.

SUMMARY OF THE INVENTION

Accordingly, an object of the present invention is to provide a novel AC motor control method which enables a region of constant output power to be enlarged when limiting the output of an AC (induction) motor.

Another object of the present invention is to provide an AC motor control method which enables the magnitude of AC motor output power to be changed in accordance with the motor load, and which also makes it possible to broaden the range of speeds over which the magnitude of the AC motor output power is constant.

A further object of the present invention is to provide an AC motor control method with which the capacity of a power supply can be reduced in accordance with the size of the AC motor load even if the AC motor itself is large in capacity, and with which a very efficient cutting operation can be performed wherein the AC motor power is utilized to the fullest extent.

Other features and advantages of the invention will be apparent from the following description in connection with the accompanying drawings.

DESCRIPTION OF THE PREFERRED EMBODIMENT

Figure 3A:
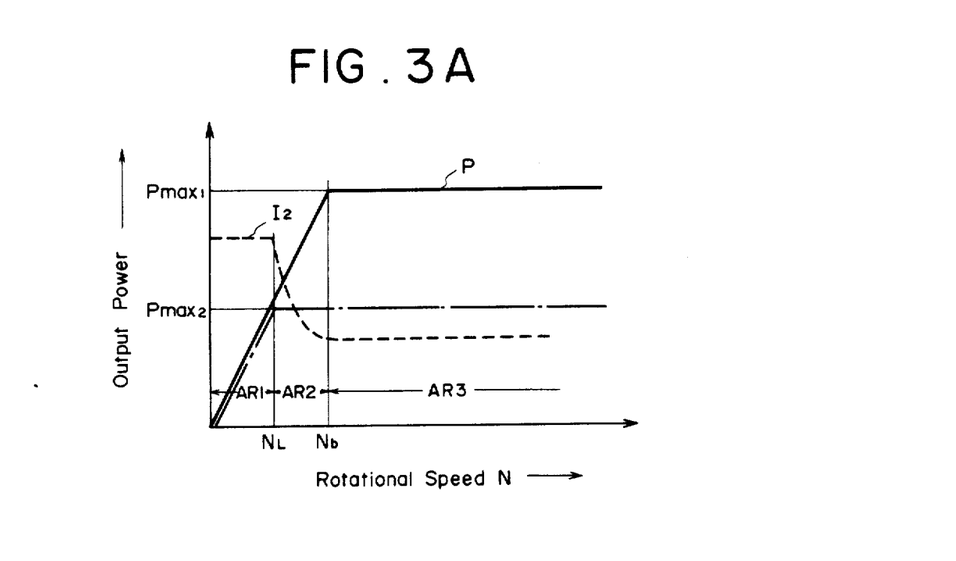
FIGS. 3A and 3B are graphs of an AC motor output-speed characteristic and slip frequency—speed characteristic, respectively, for describing the method of the present invention.

A region of a constant torque characteristic, where motor speed is less than the natural base speed Nb (about 1500 rpm), exhibits a constant slip frequency. In other words, this is a region wherein an AC motor is subjected to so-called vector control, in accordance with which both the frequency and effective value of the motor primary voltage are controlled. On the other hand, a region of constant output characteristic, where motor speed is greater than the base speed Nb, is one where slip control is applied so that slip may take on a constant value. FIG. 3A shows the output—speed characteristic of an AC motor and FIG. 3B the slip frequency—speed characteristic thereof, wherein the solid lines in both diagrams indicate the prevailing conditions in the absence of output limitation control, while the dot-and-dash lines represent application of output limitation control.

Figure 3B:
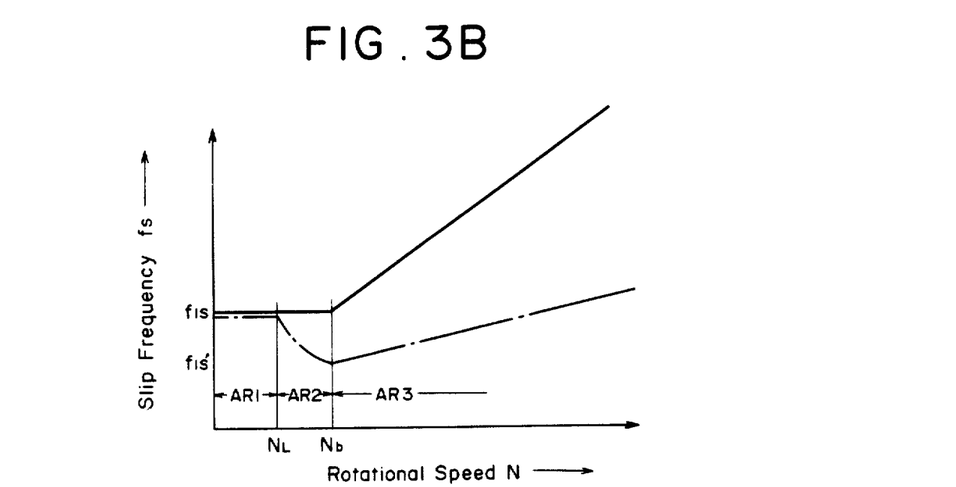

Reference well be made to FIGS. 3A and 3B to describe a control method in accordance with the present invention through which the output characteristic of an AC motor will follow the curve indicated by the dot-and-dash line (FIG. 3A) when the maximum power of the motor is changed from $P_{max_1}$ to $P_{max_2}$ by applying output limitation control. $P_{max_1}$ is the maximum output power obtainable at a base speed, e.g., 1500 rpm, which is a rotational speed on the order of one-third the maximum motor speed. $P_{max_2}$ is motor + amplifier maximum output power in a case where the motor is used after lowering the base speed by reducing maximum motor output power by a servo unit (servoamplifier). In other words, $P_{max_2}$ is the maximum output power which, by lowering the base speed through an intentional reduction in the obtainable motor output, makes it unnecessary to effect a changeover of gears or the like.

First, the ratio $\eta$ of $P_{max_2}$ to $P_{max_1}$ (referred to as the limiting ratio) and a new base speed $N_L$ following output limitation control are found from the following equations:

$$\eta = P_{max_2}/P_{max_1} \tag{1}$$

$$N_L = \eta \cdot Nb \tag{2}$$

The next step is to exercise control in such fashion that the slip frequency will remain constant up to the new base speed $N_L$ following this output limitation control (see region AR in FIG. 3B). This will cause the AC motor output power P to rise linearly as shown by the dot-and-dash line in region AR1 of FIG. 3A. The reason is that the output power P and torque T are related as follows:

$$P = wT \tag{3}$$

with the torque T being constant for rotational speeds between 0 and $N_L$. It should be noted that w is the angular frequency (corresponding to rotational speed) of the AC motor, wherein $w = 2\pi N$ (N standing for the rotational speed of the motor). Stated another way, in a region of vector control where the torque is constant, the torque can be expressed as follows:

$$T = k(r_2 I_2/sw) I_2 = \text{a constant} \tag{4}$$

in which $r_2 I_2/sw$ is the factor rendered constant by the control operation. Thus, in a region where vector control is applied, the torque T is so controlled as to be proportional to the secondary current $I_2$. In Eq. (4), k indicates a constant, $r_2$ the secondary resistance, s the slip, s·w the slip frequency, and $I_2$ the secondary current. Accordingly, for a rotational speed N ranging from 0 to $N_L$, the following relation holds:

$$T \alpha I_2 \alpha s \cdot w = f_{1s} = \text{a constant} \tag{5}$$

so that the slip frequency $f_{1s}$ $(= s \cdot w)$ is constant within said range of speeds from 0 to $N_L$. The symbol $\alpha$ in the above equation indicates a proportional relation. In other words, if the slip frequency $f_{1s}$ $(= s \cdot w)$ is rendered constant in a region of vector control, then the torque will be rendered constant and the output power P will be proportional to the motor speed, the latter following from Eq. (3).

The next step is to find the slip frequency $f_{1s}$, at the base speed Nb and then vary the slip frequency from $f_{1s}$ to $f_{1s'}$ within the range given by $N_L \leq N \leq N_b$, which change in slip frequency will be inversely proportional to the change in rotational speed N. By doing so, the output power will be held constant within said range $N_L \leq N \leq N_b$. More specifically, since the output power P must be so controlled as to be constant within the range $N_L \leq N \leq N_b$, the required condition is that the following hold, from Eq. (3):

$$T \alpha 1/w \tag{6}$$

Since vector control is in effect within the range $0 \leq N \leq N_b$, the torque is expressed by Eq. (4) so that the following holds:

$$r_2 I_2/s \cdot w = \text{a constant} \tag{7}$$

Therefore, from Eqs. (4), (6) and (7), we have:

$$T = k(r_2 I_2/s \cdot w) I_2 \alpha I_2 \alpha 1/w \tag{8}$$

Furthermore, the following will hold from Eq. (7):

$$I_2 \alpha s \cdot w \ (= f_s) \tag{8'}$$

giving the following from Eqs. (8) and (8'):

$$f_s \alpha 1/w \tag{9}$$

where $f_s$ stands for the slip frequency and $f_s = s \cdot w$. Thus the secondary current $I_2$ and slip frequency $f_s$ are both inversely proportional to the motor speed N $(= 2\pi w)$, and the slip frequency $f_{1s'}$ at the base speed Nb is given by:

$$f_{1s'} = \eta \cdot f_{1s} \tag{10}$$

To render the output power P constant at $P_{max_2}$ within the range $N_L \leq N \leq N_b$ in the foregoing, the slip frequency should be controlled in inverse proportion to the rotational speed N from $f_{1s}$ to $f_{1s'}$, as shown in region AR2 of FIG. 3(B).

Finally, in the slip region where $Nb < N$ holds, the slip s' following output limitation control is found from the following equation, using the slip s that prevails prior to output limitation control as well as the limitation ratio $\eta$:

$$s' = \eta \cdot s \tag{11}$$

Figure 4:
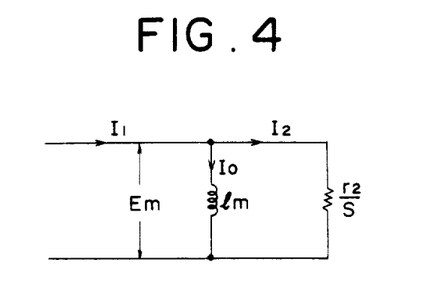
FIG. 4 is a circuit diagram of an AC motor equivalent circuit.

If control is so exercised as to render the slip s' constant, then the maximum output power can be held constant at $P_{max_2}$. More specifically, referring to the equivalent circuit of an induction motor as shown in FIG. 4, voltage $E_m$ is constant in the slip region and is given by:

$$E_m = w \cdot I_m \cdot L_o = r_2 I_2/s = \text{a constant} \tag{12}$$

where $I_o$ represents the excitation current. The torque T, meanwhile, can be expressed as follows:

$$T = 3 P_n \cdot I_m \cdot I_o \cdot I_2 \tag{13}$$

where $P_n$ represents the number of poles. From Eqs. (12) and (13) we can write:

$$T \alpha 3 P_n I_m (1/w) \cdot I_2 \tag{14}$$

Since $I_2 \alpha s$ from Eq. (12), we have:

$$T \alpha s/w \tag{15}$$

Thus, in the slip region, the torque T decreases in inverse proportion to the motor speed but in proportion to the slip s. Furthermore, since $P = wT$, from Eq. (15) we have:

$$P \alpha s = \text{a constant} \tag{16}$$

indicating that the magnitude of the power P is dependent upon the magnitude of the slip s. Accordingly, if the slip s' in a case where the output power is limited is made a multiple $\eta$ of the slips when output limitation control is not applied (where $\eta < 1$), then the output power in the slip region can be maintained of the desired value $P_{max_2}$, as shown in region AR3 of FIG. 3A.

In summary, the method of the present invention includes steps of finding the new base speed $N_L$ after the application of output limitation control, $N_L$ being derived from the base speed Nb and the ratio (limitation ratio) $\eta$ between the maximum output power $Pmax_1$ and the maximum output power $Pmax_2$ before and after output limitation control is applied, respectively, controlling the rotational speed N of the AC motor in such a manner that the slip frequency is rendered constant within the range $0 \leq N \leq N_L$, varying the slip frequency in inverse proportion to the rotational speed N within the region $N_L \leq N \leq N_b$, and varying the slip frequency in proportion to the rotational speed N in the region $Nb < N$, that is, holding the slip constant in said region. Following these steps will result in an output-speed characteristic as shown by the dot-and-dash line of FIG. 3A, wherein it will be seen that the region of constant output power is broadened up to $N_L$.

The following steps (a) through (g) explain the processing that is executed for obtaining the characteristic given by the dot-and-dash line of FIG. 3A upon limiting the output power from $Pmax_1$ to $Pmax_2$.

(a) The limitation ratio $\eta$ is found from Eq. (1).

(b) The new base speed $N_L$ following the application of output limitation control is found from Eq. (2). It should be noted that the base speed Nb before output limitation is a known quantity, such as 1500 rpm.

(c) The slip frequency $f_{1s}$ at the base speed Nb and the slip s' in the slip region are found from Eqs. (10) and (11), respectively.

(d) A relation involving the slip frequency $f_s$ in the base speed range from $N_L$ to Nb is determined. Specifically, $f_s$ can be expressed by the following:

$$f_s = a/N + b \quad (17a)$$

Since $f_s = f_{1s}$ when $N = N_L$, and since $f_s = f_{1s}' = \eta \cdot f_{1s}$, a relation involving the slip frequency $f_s$ in the region $N_L \leq N < N_b$ is determined when the above values for $f_s$ are substituted in Eq. (17a) to find a and b. Here a and b are given by the following:

$$a = f_{1s}(1-\eta)N_L \cdot Nb/(Nb - N_L) \quad (17b)$$

$$b = f_{1s}(\eta \cdot Nb - N_L) \quad (17c)$$

(e) A correspondence table between the slip frequency $f_s$ and the rotational speed N is created using Eqs. (17a) through (17c), and the table is stored in memory.

(f) The rotational speed N is sensed and the slip frequency $f_s$ is found from the correspondence table.

(g) Thenceforth a three-phase primary voltage is generated through known means.

Note that an arrangement is possible wherein, in place of steps (e) and (f), the slip frequency is computed on each occasion by using Eq. (17a) and a, b obtained from step d. An alternative arrangement, which will be described in greater detail below, is to obtain and store beforehand a correspondence table between the rotational speed N and a value $S_v$ to be set in a slip counter, read a prescribed set value $S_v$ conforming to the rotational speed out of the correspondence table and set said value in the slip counter, and frequency-divide clock pulses of a predetermined frequency F by this set value $S_v$ to obtain the slip frequency.

Figure 5:
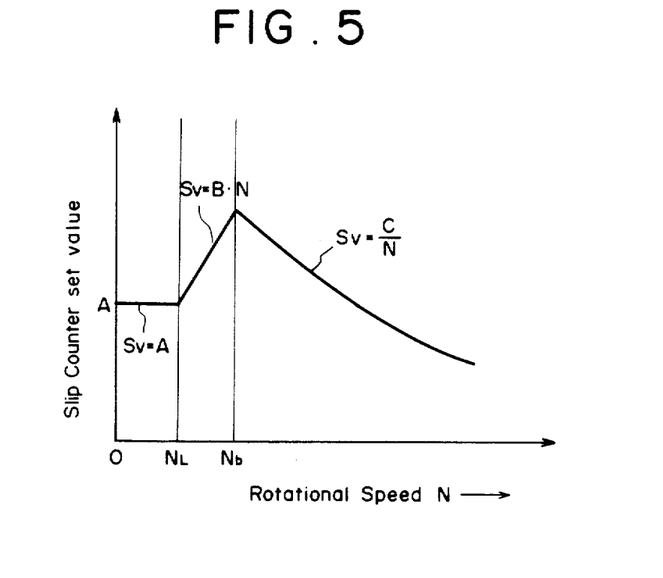
FIG. 5 is a graph showing a characteristic curve for a case where the value set in a slip counter is plotted against the speed of an AC motor.

FIG. 5 shows the correspondence between the rotational speed N and the value $S_v$ set in the slip counter. It will be seen that: $S_v = A$ in the range of speeds $0 \leq N \leq N_L$; $S_v = B \cdot N$ in the range of speeds $N_L < N \leq Nb$; and $S_v = C/N$ in the range of speeds $N_b < N$, where A, B and C are constants. As a result, a slip frequency $f_s$ obtained by frequency-dividing clock pulses of a fixed frequency F by the set value $S_v$ will be given by: $f_s = F/A$ (a constant) for $0 < N < N_L$; $f_s = F/B \cdot N$, which is inversely proportional to the rotational speed N, for $N_L < N < Nb$; and $f_s = F \cdot N/C$, which is proportional to the rotational speed N, for $Nb < N$. By suitably deciding the constants A, B and C, therefore, the slip frequency $f_s$ can be made to vary as indicated by the dot-and-dash line of FIG. 3B.

Figure 6:
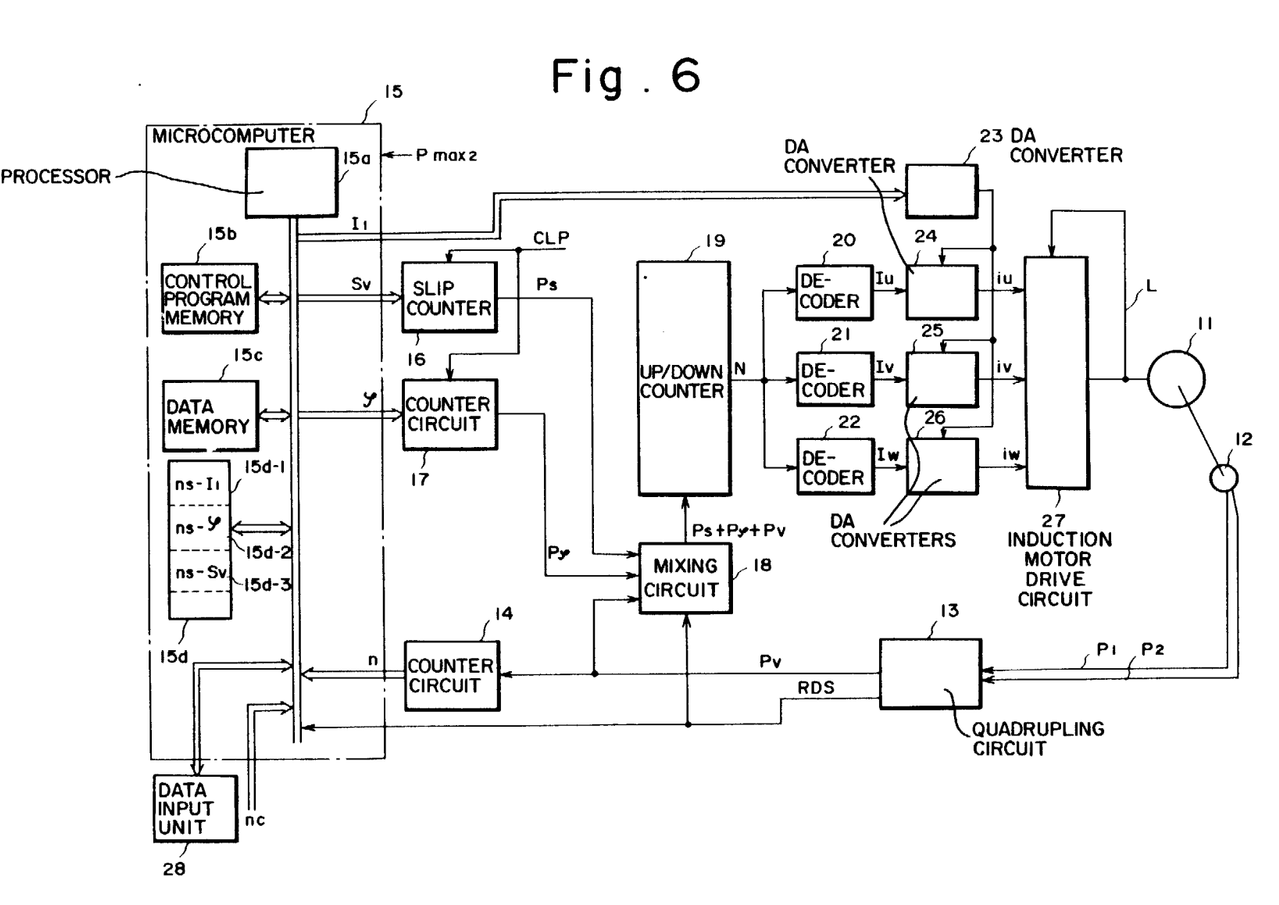
FIG. 6 is a block diagram of an arrangement for practicing the method of the present invention.

Reference will now be had to the block diagram of FIG. 6 to describe an arrangement for practicing an AC motor control method in accordance with the present invention.

Numeral 11 denotes the AC motor, e.g., induction motor. The arrangement for controlling the motor includes a pulse generator 12 for generating first and second pulse trains P1, P1 displaced in phase from each other by $\pi/2$ and having a frequency $f_v$ proportional to the speed of the AC motor, and a quadrupling circuit 13 which differentiates the first and second pulse trains P1, P2 from the pulse generator 12 for producing a pulse train $P_v$ where the frequency $F_v$ thereof is four times the frequency $f_v$ (i.e., $F_v = 4 \cdot f_v$). The quadrupling circuit 13 also produces a rotational direction signal RDS upon discriminating the phase difference between the first and second pulses trains P1, P2. A counter circuit 14 counts the pulses in the pulse train $P_v$ and is reset each time its content is read at predetermined time intervals by a processor, described later, whereupon the counter circuit counts the pulses Pv again starting from zero. More specifically, the value of the count within the counter circuit 14 represents the actual rotational speed n of the AC motor 11, namely the angular frequency $w_n$. The arrangement also includes a microcomputer 15 having a processor 15a, a control program memory 15b, a RAM serving as a data memory 15c, and a ROM serving as a correspondence table memory 15d. The correspondence table memory 15d has a first storage area 15d-1 for storing the corresponding relationship between $n_s$, namely the difference between a commanded speed $n_c$ and the actual motor speed n, and amplitude $I_1$, a second storage area 15d-2 for storing the corresponding relationship between $n_s$ and a phase difference $\phi$, and a third storage area 15d-3 for storing the corresponding relationship between the actual speed n and value $S_v$ to be set in a slip counter 16. The control program memory 15b stores a control program for administering a variety of computations and control operations. Under the control of the control program, the microcomputer 15 computes the difference $n_s$ between the commanded speed $n_c$, which enters from a commanded speed generating circuit (not shown), and the actual speed n, and reads, from the first, second and third storage areas, the amplitude $I_1$ and phase difference $\phi$ corresponding to the difference $n_s$, as well as the set value $S_v$ corresponding to the actual speed n. The microcomputer 15 delivers these values as output signals. The abovementioned slip counter 16 is a presettable counter in which the value $S_v$ is loaded, the counter being adapted to generate pulses $P_s$ indicative of the slip angular frequency $w_s$ ($= 2\pi f_s$) by frequency-dividing a clock pulse train CLP by the set value $S_v$. By way of example, letting the set value $S_v$ be m, a single slip pulse $P_s$ will be produced upon the generation of m-number of clock pulses CLP. In other words, the slip counter 16 divides the frequency F of the clock pulses CLP by m to produce a pulse train $P_s$ having the slip frequency $f_s$, namely F/m. It should be noted that this frequency division operation brings the slip angular frequency $w_s$ into conformance with the angular frequency $w_n$ of the motor speed. A presettable counter circuit 17 is set to the phase difference $\phi$ and is adapted to produce a pulse train $P_\phi$ of a frequency commensurate with the phase difference. A mixing circuit 18 combines (a) the pulse train $P_v$ from the quadrupling circuit 13, the pulse train indicating an angular frequency $w_n$ conforming to the actual speed of the motor 11, (b) the pulse train $P_s$ from the slip counter 16, indicative of the slip angular frequency $w_s$, and (c) the pulse train $P_\phi$ from the counter circuit 17, having a frequency commensurate with the phase difference $\phi$.

The arrangement is also provided with an up/down counter 19 for reversibly counting the pulses from the mixing circuit 18 in accordance with the sign of the pulses. Note that the status of the up/down counter 19 at any given time will be a numerical value N corresponding to $wnt + wst + \phi$. A signal from the up/down counter 19 indicative of N is applied to three decoders 20, 21, 22. These decoders 20, 21, 22 have correspondence tables establishing correspondence between N and sin N, sin $(N+2\pi/3)$, and sin $(N+4\pi/3)$, respectively. The decoders receive the numerical value N as a high-rate input and successively produce respective U-, V- and W-phase current commands (digital values) $I_U$, $I_V$, $I_W$ commensurate with the numerical value N. A digital-to-analog converter (referred to hereinafter as a DA converter) 23 receives the signal indicative of the amplitude $I_1$ from the microcomputer 15. Multiplying-type DA converters 24, 25, 26 receive IU, IV and IW, respectively, as well as the output of the DA converter 23. The latter is operable to convert the amplitude $I_1$, which is a digital value, into an analog voltage proportional to $I_1$. The multiplying-type DA converters 24 through 26 are adapted to multiply the three-phase current command values $I_U$, $I_V$, $I_W$ by the amplitude $I_1$ and convert the results into respective analog signals to generate three-phase analog current commands, namely:

$$i_u = I_1 \sin(w_n t + w_s t + \phi) \quad (18)$$

$$i_v = I_1 \sin(w_n t + w_s t + \phi + 2\pi/3) \quad (19)$$

$$i_w = I_1 \sin(w_n t + w_s t + \phi + 4\pi/3) \quad (20)$$

The arrangement further includes an induction motor drive circuit 27 composed of a pulse width modulator, inverter circuitry and the like, which are not shown. Power transistors constructing the inverter circuitry are switched on and off by the output of the pulse width modulator for supplying the induction motor 11 with three-phase current. A line L is a feedback line for a current minor loop. Designated at 28 is a data input unit.

In operation, the data input unit 28 supplies the microcomputer 15 with the maximum output power $P_{max2}$ after the application of output limitation control. It should be noted that the maximum output power $P_{max1}$ without the limitation on output, the base speed Nb, the slip frequency $f_{1s}$ in the region where the slip frequency is constant, and the slip s in the region of where the slip is constant, have already been stored in the data memory 15c. Upon receiving the maximum output power $P_{max2}$, the microcomputer 15 executes the above-described steps (a) through (d) under the control of the control program for generating the correspondence table between the rotational motor speed N and the value $S_v$ set in the slip counter 16. The table is stored in the correspondence table memory 15d. When the speed command generating means (not shown) issues a speed command $n_c$ under these conditions, the three-phase induction motor 11 attempts to rotate at the speed $n_c$. With rotation of the motor 11, the pulse generator 12 generates the first and second pulse trains P1, P2 displaced in phase by $\pi/2$, the frequencies whereof are proportional to the actual rotational speed n of the motor 11. The quadrupling circuit 13 quadruples these pulse trains P1, P2 to produce the pulse train $P_v$ indicating the angular frequency $w_n$, and also produces the rotational direction signal RDS. The pulse train $P_v$ is fed into the mixing circuit 18 and the counter circuit 14, where the pulses are counted. The value of the count in counter circuit 14 is a numerical value corresponding to the rotational speed n of the motor, and is read out of the counter circuit at a predetermined sampling period by the processor 15a. The processor 15a then proceeds to compute the difference $n_s$ between the commanded speed $n_c$ and the rotational speed n, and to fetch from the first, second and third storage areas 15d-1, 15d-2, 15d-3 of the correspondence table memory 15d the amplitude I1 and phase difference $\phi$ corresponding to the difference $n_s$, as well as the set value $S_v$ corresponding to the actual motor speed n. The signals indicative of $I_1$, $\phi$ and $S_v$ are applied to the DA converter 23, counter circuit 17 and slip counter 16, respectively. As a result, the slip counter 16 produces the pulse train $P_s$ indicative of the slip angular frequency $w_s$ decided by the characteristic having the appearance of the dot-and-dash line in FIG. 3B, and the counter circuit 17 produces the pulse train $P_{100}$ corresponding to the phase difference $\phi$. The pulse trains $P_s$, $P_\phi$ are combined by the mixing circuit 18 with the pulse train $P_v$ of the angular frequency $w_n$ corresponding to the actual motor speed n. The pulse train output of the mixing circuit 18 enters the up/down counter 19 where the pulses are counted up or down in accordance with their sign. The content of the up/down counter 19 is the numerical value N, which corresponds to $w_n t + w_s t + \phi$. The decoders 20 through 23 receive the numerical value N and, using the internal correspondence tables N−sin N, N−sin $(N+2\pi/3)$ and N−sin $(N+4\pi/3)$, supply the multiplying type DA converters 24 through 26 with the U-, V- and W-phase current commands $I_U$, $I_V$, $I_W$, respectively. As a result, the DA converters 24 through 26 generate the three-phase analog current commands $i_u$, $i_v$, $i_w$, expressed by Eqs. (18) through (20), using the amplitude signal $I_1$ from the DA converter 23, as well as the current commands $I_U$, $I_V$, $I_W$. The analog current commands are fed into the induction motor drive circuit 27. The latter pulse-modulates the signals $i_u$, $i_v$, $i_w$ and supplies the induction motor 11 with three-phase current produced by switching the power transistors of the inverter circuitry on and off in accordance with the output of the internal pulse modulator. Thereafter, the control operation proceeds in the same manner to regulate the slip frequency in accordance with the motor speed, as shown by the dot-and-dash line in FIG. 3B, the output power being rendered constant above the base speed $N_L$ to widen the region of constant output power, as indicated by the dot-and-dash line in FIG. 3A.

According to the present invention as described and illustrated hereinabove, the region over which the output power is constant can be widened when limiting the output of an AC motor, enabling the capacity of the power supply to be reduced even for an AC motor of a large capacity. Since the invention reduces the number of gear stages that are necessary, moreover, such machine tools as a machining center can be made smaller in size. The invention also makes it possible to carry out a cutting operation wherein the output power of the AC motor is utilized to the fullest extent.

As many apparently widely different embodiments of the present invention may be made without departing from the spirit and scope thereof, it is to be understood that the invention is not limited to the specific embodiments thereof except as defined in the appended claims.

What we claim is:

1. A method of controlling an induction motor which exhibits a constant torque characteristic at a rotational speed N below a first base speed $N_b$ and a constant output characteristic at a rotational speed N above the first base speed $N_b$, comprising the steps of:
    (a) finding a second base speed $N_L$ after limiting the output power of the induction motor, $N_L$ being derived from the base speed $N_b$ and the ratio $\eta$ between maximum output power $Pmax_1$ and the maximum output power $Pmax_2$ before and after the output power of the induction motor is limited, respectively;
    (b) rendering the slip frequency of the induction motor constant until the rotational speed N of the induction motor reaches the second base speed $N_L$;
    (c) varying the slip frequency in inverse proportion to the rotational speed N for N between $N_L$ and $N_b$ ($N_L < N \leq N_b$), said step (c) comprising:
        (ci) finding a slip frequency $f_{1s}$ at the first base speed $N_b$ by multiplying said ratio $\eta$ and a constant slip frequency $f_{1s}$ together, wherein the latter resides in a region where the slip frequency is constant and is stored in memory beforehand; and
        (cii) varying the slip frequency in inverse proportional to the rotational speed N in such a manner that the slip frequency takes on the value $f_{1s}$ at the base speed $N_b$; and
    (d) varying the slip frequency in proportion to the rotational speed N for N above $N_b$ ($N_b < N$), said step (d) comprising:
        (di) finding a slip s' at a rotational speed N above the first base speed $N_b$ by multiplying said ratio $\eta$ and a constant slip s together, wherein the latter resides in a region where the slip is constant and the slip frequency is proportional to the induction motor rpm, the slip s being stored in memory beforehand; and
        (dii) varying the slip frequency in proportion to the rotational speed N, with the slip s' serving as a proportional constant at a rotational speed N above $N_L$;

whereby the output power of the induction motor is rendered constant at a rotational speed N above $N_L$.

2. A method of controlling an induction motor according to claim 1, in which a slip frequency $f_s$ in the region $N_L < N \leq N_b$ is computed from $$f_s = a/N + b$$

where $f_s = f_{sl}$ at $N = N_L$, and $f_s = \eta f_{1s}$ at $N = N_b$.

3. A method of controlling an induction motor according to claim 1, in which a correspondence table between the rotational speed N and a set value $S_v$ corresponding thereto is stored in memory in advance, a particular set value corresponding to a particular rotational speed is read out of the memory, and clock pulses of a constant frequency F are frequency-divided by the read set value to generate pulses, the frequency of which is indicative of slip frequency.

4. A method of controlling an induction motor according to claim 3, in which $S_v = A$ for N in the range $0 < N \leq N_L$, $S_v = B \cdot N$ for N in the range $N_L < N \leq N_b$, and $S_v = C/N$ for N in the range $N_b < N$, where A, B and C are constants.

5. A method of controlling an induction motor having a base speed, said method comprising the steps of:
    (a) maintaining a constant motor slip frequency from zero rotational speed to a lowered base speed corresponding to an increased output power range;
    (b) varying the motor slip frequency inversely proportional to the rotational speed when the rotational speed is greater than the lowered base speed and less than or equal to the base speed; and
    (c) varying the motor slip frequency in proportion to the rotational speed when the rotational speed is above the base speed.

* * * * *

UNITED STATES PATENT AND TRADEMARK OFFICE
CERTIFICATE OF CORRECTION

PATENT NO. : 4,499,414

DATED : February 12, 1985

Page 1 of 2

INVENTOR(S) : Fujioka et al.

It is certified that error appears in the above-identified patent and that said Letters Patent is hereby corrected as shown below:

Col. 2, line 21, "showing" should be --of--;
       line 46, "well" should be --will--.

Col. 3, line 17, "w" should be --$\underline{w}$--.

Col. 4, line 22, "s'" should be --$\underline{s}$'--;
       line 23, "s" should be --$\underline{s}$--;
       line 28, "s'" should be --$\underline{s}$'--;
       line 55, "s" should be --$\underline{s}$--;
       line 61, "s" should be --$\underline{s}$--;
       line 62, "s'" should be --$\underline{s}$'--
       line 63, "slips" should be --slip s--;
       line 65, "of" should be --at--.

Col. 5, line 37, "a and b" should be --$\underline{a}$ and $\underline{b}$--;
       line 37, "a" (second occurrence) should be --$\underline{a}$--;
       line 38, "b" should be --$\underline{b}$--;
       line 54, "a,b" should be --$\underline{a}$,$\underline{b}$--;
       line 55, "d" should be --$\underline{d}$--.

Col. 6, line 35, "n" should be --$\underline{n}$--;
       line 43, "n" should be --$\underline{n}$--;
       line 55, "n" should be --$\underline{n}$--;
       line 58, "n" should be --$\underline{n}$--;
       line 60, "abovementioned" should be --above-mentioned--;
       line 68, "m" should be --$\underline{m}$--.

UNITED STATES PATENT AND TRADEMARK OFFICE
CERTIFICATE OF CORRECTION

PATENT NO. : 4,499,414

DATED : February 12, 1985

INVENTOR(S) : Fujioka et al.

It is certified that error appears in the above-identified patent and that said Letters Patent is hereby corrected as shown below:

Col. 7, line 62, "s" should be --$\underline{s}$--.

Col. 8, line 9, "n" should be --$\underline{n}$--;
line 17, "n" should be --$\underline{n}$--;
line 21, "n" should be --$\underline{n}$--;
line 24, "Il" should be --$\underline{I}_1$--;
line 26, "n" should be --$\underline{n}$--;
line 33, "$P_{100}$" should be --$P\emptyset$--.

Col. 10, line 3, "s" should be --$\underline{s}$--;
line 6, "s" should be --$\underline{s}$--.

Signed and Sealed this

Twentieth Day of August 1985

[SEAL]

Attest:

DONALD J. QUIGG

Attesting Officer     Acting Commissioner of Patents and Trademarks